(No Model.)
A. F. BROCKWAY.
WATCHMAKER'S CALIPERS.
No. 520,558. Patented May 29, 1894.
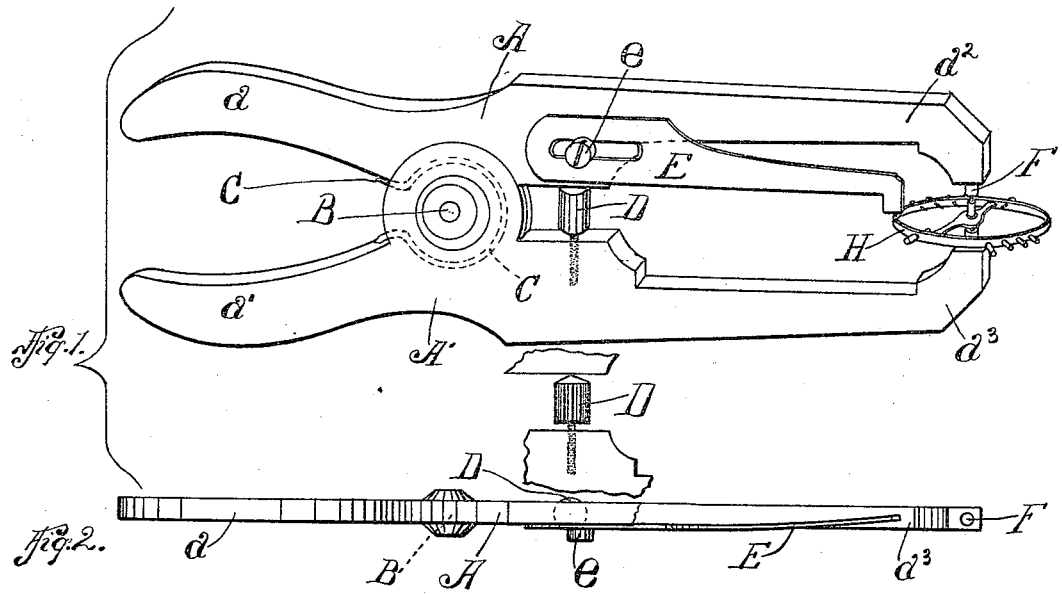
Fig. 1.
Fig. 2.
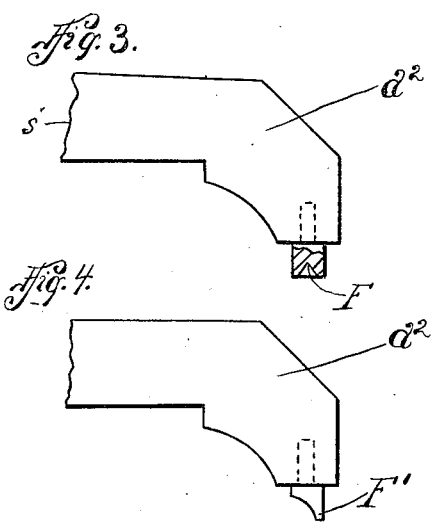
Fig. 3.
Fig. 4.
Witnesses.
P. W. Harbison.
F. M. Townsend.
Inventor.
Adna F. Brockway
By Hazard & Townsend
his attys.

UNITED STATES PATENT OFFICE.

ADNA F. BROCKWAY, OF PASADENA, CALIFORNIA.

WATCHMAKER'S CALIPERS.

SPECIFICATION forming part of Letters Patent No. 520,558, dated May 29, 1894.

Application filed December 12, 1892. Serial No. 454,813. (No model.)

*To all whom it may concern:*

Be it known that I, ADNA F. BROCKWAY, a citizen of the United States, residing at Pasadena, in the county of Los Angeles and State of California, have invented a new and useful Improved Watchmaker's Calipers, of which the following is a specification.

My invention relates particularly to that class of calipers adapted for truing the balance wheels of watches.

In truing balance wheels of watches it is necessary that the pivots of the wheel be held perfectly rigid in position in their bearings, but yet not receive sufficient pressure to prevent the wheel from revolving freely. The ordinary calipers used by watch-makers for truing wheels are those having a friction joint for securing the jaws or arms together, and in practical use it frequently occurs that in closing the jaws upon the stem of the wheel, too great force is used and the delicate pivots of the stem are bent or broken before the operator is aware.

It has heretofore been proposed to provide a watch truing calipers having the bearings which receive the pivots of the stem arranged in spring pressed caliper centers which are each arranged inside of a hollow barrel or jaw head secured to the jaw and so arranged that when force is applied to close the jaws together the caliper centers will yield on coming into contact with the pivots of the wheel stem and will each recede into its respective barrel thus allowing the two jaw heads to clamp upon the arms of the wheel to hold the wheel rigid so it may be trued without removing it from the calipers. The difficulty with this construction is that in order to prevent the pressure upon the pivots from being so great as to bend when the calipers are closed to clamp the jaw heads upon the arms of the wheel, the caliper center pressing springs must be so weak and yielding that they will not hold the caliper centers with that degree of rigidity which is essential to the accurate centering of the pivots of the balance wheel while the wheel is being revolved to discover the inaccuracies thereof.

The object of my invention is to provide calipers of this class which will possess the utmost delicacy of operation in practical use, and which will be provided with an adjustable stop whereby the jaws may be adjusted with great convenience and extreme delicacy to receive the pivots of the stem of a balance wheel and to hold the pivots rigidly in position without exerting any appreciable pressure upon such pivots, and to so arrange the various parts that when the jaws are opened to place the pivots of the wheel stem in the caliper centers or to remove them therefrom, the adjusting stop will be entirely free from contact with one of the jaws, thus to allow perfect freedom of motion to the jaws.

My invention does not consist broadly in providing calipers with pivot holding centers nor in providing calipers with an adjusting screw secured to one jaw and detached from the other jaw but it consists in the entire tool hereinafter particularly described and claimed comprising certain elements and combinations set forth herein and illustrated in the accompanying drawings.

Figure 1 is a perspective view of my improved calipers as adapted for balance-wheel truing calipers. A detail of the gage screw is also shown in a fragmental elevation. Fig. 2 is a plan or edge view of the calipers with a portion of the upper arm broken away. Fig. 3 is an enlarged sectional detail of the end of one arm of the calipers shown in Fig. 1. Fig. 4 is a like detail of the arm of the calipers adapted for making measurements.

The two substantially straight arms A A' have respectively at one end a handle $a$ ($a'$) and at the other end a jaw $a^2$ ($a^3$). These two arms are pivoted to each other intermediate their ends by a suitable pivot B and are provided with the caliper centers having the conical pivot receiving cavities F. A spring C is arranged to spread the handles apart and the caliper centers F together.

D is the adjusting stop screw arranged projecting from the inner face of the shanks of one of the jaws and having its screw stem screwed into the inner face of such shank $s$ of the jaw between the pivot B and the caliper center F at the free end of the jaw. The head of the screw is arranged to intercept the shank $s'$ of the other jaw between its caliper center and its pivot to hold the jaws apart against the action of the spring C, and forms a thumb piece by which the screw is turned. One of the jaws is provided with the truing bar E adjustably secured to such jaw by means of the clamp screw e. A truing bar in connection with one of the jaws of a caliper is not claimed to be new. The adjusting screw holds the jaws at the proper distance apart while the spring holds the jaws as close together as the screw will admit.

In practice the screw D is set while the wheel (H) is in place with its pivots in the centers F, being adjusted to allow the wheel to revolve freely without looseness. Then the truing bar is adjusted to the rim of the wheel and the wheel revolved as customary to detect the eccentricity of the wheel and to show which way it should be bent to true it. When this has been determined the jaws are spread apart, the wheel removed and bent and then replaced to verify the work and this can be done with great facility until the wheel is true for the reason that the opening and closing of the jaws does not disarrange the adjustment of any of the parts and the spring will return the centers and truing bar to the exact position to which they were originally set.

The advantage of the substantially straight arms which constitute the jaws and handles is that the tool is thus made more convenient for handling when used as a wheel truing calipers.

F' indicates the measuring point of the jaw shown in Fig. 4.

By applying the measuring point F' to the jaws the instrument can be used in the nature of common measuring calipers. Such use, however is incidental and forms no part of my present claim.

Now, having described my invention, what I claim as new, and desire to secure by Letters Patent, is—

The wheel truing calipers set forth comprising the combination of the two arms pivoted to each other intermediate their ends by a suitable pivot and having respectively, at one end a handle and at the other end a jaw provided with a caliper center; the pivot; the spring arranged to force the handles apart and the jaws together, and the adjusting screw stop provided with the thumb piece rigid with such stop, arranged between the jaws and having its stem screwed into the shank of one of the jaws between the pivot and the caliper center of the jaw, and having its head arranged to intercept the shank of the other jaw between its caliper center and the pivot; whereby the screw stop is brought entirely between the two shanks and out of the way of the operator.

ADNA F. BROCKWAY.

Witnesses:
JAMES R. TOWNSEND,
ALFRED I. TOWNSEND.